Figure 1:
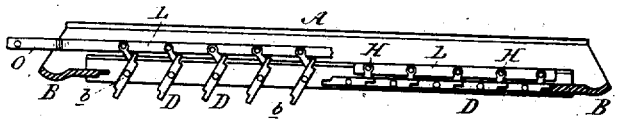

C. F. SMITH.

ASH PAN FOR LOCOMOTIVES.

No. 10,453. Reissued Feb. 26, 1884.

Witnesses:

A. N. Batchelder

W. H. Doyle

Inventor:

C. F. Smith

By R. B. Wheeler

Atty

UNITED STATES PATENT OFFICE.

CHARLES F. SMITH, OF WEST BAY CITY, MICHIGAN.

ASH-PAN FOR LOCOMOTIVES.

SPECIFICATION forming part of Reissued Letters Patent No. 10,453, dated February 26, 1884.

Original No. 281,936, dated July 24, 1883. Application for reissue filed December 5, 1883.

*To all whom it may concern:*

Be it known that I, CHARLES F. SMITH, a citizen of the United States, residing at West Bay City, in the county of Bay and State of Michigan, have invented a new and useful Ash-Pan for Locomotives, of which the following is a specification.

Locomotives are at present supplied with an ash-pan for catching the cinders and ashes as they drop from the grate-bars, the said ash-pan being made with a solid bottom, and the cinders and ashes remain within the pan until they are taken into the repair-shop and cleaned. The cinders are then left at the side of the track until a sufficient quantity accumulates, when they are shoveled into a train of flat cars and hauled away for ballasting some part of the road-bed, making a great expense and trouble in their disposition and removal. This pan also, when running through snow and drifts, catches up the snow, which, mixed with cinders and ashes, freezes and forms ice, which fills up the front of the ash-pan and prevents proper draft to the fire in the fire-box, and often necessitates the stopping of a train that it may be removed, which removal is often very difficult to perform, owing to the limited space and inconvenient position the workman must be placed in, and the frozen mixture being so hard as to require the use of hammer and chisel to dig it out, so that often hours are spent in this operation, which makes a vexatious as well as unprofitable delay.

The object of my invention is to provide an ash-pan that may be emptied at any point along the road while the train is in motion, and at the same time distribute the ashes and cinders without extra expense or labor; also, to provide a device by means of which the snow and ice can be thawed out by hot water from the boiler, and at the same time wash out the bottom of the ash-pan and quench any fire that may have dropped into the ash-pan from the grate-bars.

My invention consists, mainly, in an ash-pan constructed with a number of leaves, so arranged that when closed or placed in a horizontal position they form a closed level bottom for the ash-pan, and when tilted they allow the contents thereof to drop between and fall to the ground; also, an arrangement of a pipe so constructed as to allow a number of jets of hot water and steam from the boiler to flow over these leaves forming the bottom of the ash-pan, for extinguishing the fire and thawing out the snow and ice accumulated therein. Said leaves when turned to a vertical position may be thoroughly cleaned by the hot water and steam being blown over them by steam-pressure from the boiler.

In order to aid others skilled in the art to which my invention relates to make and use the same, I will proceed to describe its construction and operation with reference to the several drawings forming a part of this specification, in which—

Figure 2:
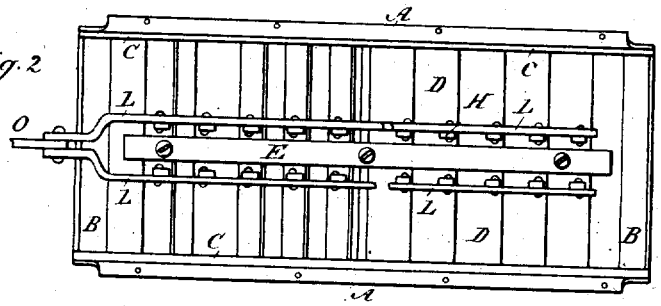
Figure 3:
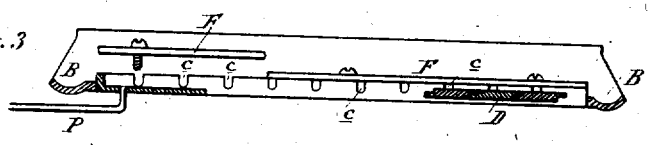
Figure 4:
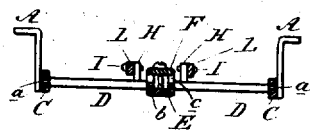

Figure 1 is a longitudinal sectional view of an ash-pan embodying my invention. Fig. 2 is a top perspective of my invention. Fig. 3 is a side elevation in section, showing center bed-piece. Fig. 4 is a transverse section of Fig. 2.

A is the sides of the pan, which are bolted to the water-leg of the boiler.

B is the solid plate at each end of the pan.

C are pieces bolted to the sides A, and are provided with holes *a*.

D are leaves, which overlap each other when closed or lying flat, and form the tight or closed bottom of the ash-pan, as shown in Figs. 1 and 2. These leaves D are provided at each end with the pivots *b*. Those on one end are engaged with the holes *a* in the bed-piece C, while those on the opposite end are placed in the slots *c* in the hollow center bed-piece, E. The center bed-piece, E, is constructed hollow and with the ends closed, and provided with the slots *c* for the reception of the pivots *b*. It is also arranged so that the cap-piece F, which is bolted on, can be removed to allow the leaves D to be easily placed in position or removed as easily.

Connected with the hollow bed-piece E is a pipe, P, which is also connected with the boiler at the opposite end, and provided with a valve or gate for the admittance of water under pressure from the boiler. The slots *c* are arranged so that when the pivots *b* are resting in the lower part the upper part remains open for the passage of water, which is forced through them from the boiler for extinguishing any fire that may be in the pan before emptying it upon the road-bed; also, for thawing out the ice that may be in the pan.

On the upper side of the leaves D are attached ears or lugs H, to which are pivoted, by the pins I, the bars L. O is a bar or strap connecting with a lever in the cab of the locomotive, and these bars L, thus connecting all the leaves together, on being drawn backward by the lever in the cab, causes all the leaves to revolve on the pivots *b*, and allow the contents of the pan to drop through the openings thus formed to the ground. These leaves D may be taken out separately by removing the cap F and drawing out the pin I, when one or more leaves may be removed for repairing the water-leg of the boiler or removing grate-bars, &c.; and, also, as the ash-pan bottom may be easily kept clean and washed out, corrosion of the bottom is avoided.

The center bed-piece, E, may be used on an ordinary ash-pan for thawing out the ice and accomplish the same result, as the jets of hot water will operate the same as in my improved pan. The hollow bed-piece acts as a steam-pipe to put out all fire in the pan before dumping its contents. It is supplied with hot water and steam by a pipe leading from the boiler-head, for the purpose of putting out the fire that may drop from the grates, acting at the same time as a preventive against ice, which in winter-time freezes so hard it takes several hours to remove it, while with my improvement (hot water and steam applied) a few seconds only are required to thaw the ice when formed, so that delay and unnecessary labor are avoided.

Having thus described my invention in the most exact terms that I can give, what I claim as new, and desire to secure by Letters Patent, is—

1. In an ash-pan of a locomotive, the combination of the revolving leaves D, provided with the lugs H, pivoted by the bolts I to the connecting-bar L, with the bed-pieces C and center bed-piece, E, substantially as described.

2. In an ash-pan for locomotives, the hollow bed-piece E, provided with the detachable cap F and the slots *c*, in combination with the revolving leaves D and the pivots *b*, substantially as described and shown.

3. In an ash-pan for locomotives, the hollow bed-piece E, provided with the slots *c* in each side, substantially as shown, and for the purposes specified.

CHARLES F. SMITH.

Witnesses:
JOHN BRIGHAM, Jr.
D. R. CURREY.